United States Patent [19]
Tamura

[11] Patent Number: 5,033,306

[45] Date of Patent: Jul. 23, 1991

[54] QUARTZ VACUUM GAUGE

[75] Inventor: Fujio Tamura, Sendai, Japan

[73] Assignee: Seiko Electronic Components Ltd., Japan

[21] Appl. No.: 365,758

[22] Filed: Jun. 13, 1989

[30] Foreign Application Priority Data

Jun. 13, 1988 [JP] Japan ............................ 63-145112

[51] Int. Cl.[5] ............................................ G01L 21/12

[52] U.S. Cl. ...................................... 73/755; 73/708; 310/319

[58] Field of Search ................ 73/755, 754, 753, 702, 73/704, 708; 310/319

[56] References Cited

U.S. PATENT DOCUMENTS

| | | | |
|---|---|---|---|
| 3,580,081 | 5/1971 | Greenberg et al. | 73/755 |
| 4,197,752 | 4/1980 | Block | 73/755 |
| 4,471,661 | 9/1984 | Edwards, Jr. | 73/755 |
| 4,541,286 | 9/1985 | Holme | 73/755 |
| 4,633,717 | 1/1987 | Scholl | 73/755 |
| 4,684,842 | 8/1987 | Maruno et al. | 73/754 |
| 4,729,242 | 3/1988 | Reich et al. | 73/755 |
| 4,741,213 | 5/1988 | Hojoh | 73/702 |
| 4,747,311 | 5/1988 | Hojoh | 73/702 |
| 4,959,999 | 10/1990 | Tamura | 73/755 |

OTHER PUBLICATIONS

J. Phys. E. Sci. Instrum (GB), vol. 5, No. 5, May 1972 W. Steckelmacher et al.

Journal of Vacuum Science & Technology A, vol. 4, No. 3, Part II, Second Series, May/Jun. 1986, pp. 1728-1731, Ono et al.

*Primary Examiner*—Joseph A. Orsino

*Assistant Examiner*—Brent A. Swarthout

*Attorney, Agent, or Firm*—Bruce L. Adams; Van C. Wilks

[57] ABSTRACT

A vacuum gauge for measuring pressure of environmental gas includes a quartz resonator disposed in the gas, and undergoing oscillation having a resonant frequency dependent on its body temperature which is dependent on relatively low pressure and having a resonant current which is dependent on relatively high pressure. Heat source is disposed adjacent to the resonator for supplying heat to the resonator so as to maintain the body temperature thereof and resonant frequency thereof according to the pressure of environmental gas, and producing an first output signal representative of value of the pressure in relatively low pressure range. A converter converts the resonant current of resonator into a corresponding second output signal representative of value of the pressure in relatively high pressure range. A meter indicates the value of pressure according to the first and second output signals.

10 Claims, 2 Drawing Sheets

QUARTZ VACUUM GAUGE

BACKGROUND OF THE INVENTION

The present invention relates to a quartz vacuum gauge utilizing a temperature-sensitive quartz resonator for continuously measuring gas pressure in the range from atmospheric pressure ($10^3$ Torr) to lower pressure (about $1 \times 10^{-4}$ Torr).

Generally, a vacuum gauge of the thermal-conduction type such as a Pirani vacuum gauge is used for measurement of the gas pressure in middle and low pressure range ($10^{-4}$ to $10^{-1}$ Torr), but this type does not have sufficient sensitivity over gas pressure range of $10^{-1}$ Torr and therefore cannot be used over $10^{-1}$ Torr.

On the other hand, recently there has been developed another type of quartz vacuum gauge utilizing dependency of the resonant resistance of quartz resonator on surrounding gas pressure (hereinafter, referred to as a "quartz friction vacuum gauge"). The quartz friction vacuum gauge can be used to measure the gas pressure in the range from $10^{-2}$ Torr to atmospheric pressure.

Namely, the quartz vacuum gauge of the thermal conduction type has high sensitivity in the lower gas pressure range, but cannot effect measurement in the middle to atmospheric pressure range, while the other quartz friction vacuum gauge can measure the gas pressure in the range from atmospheric pressure to $1 \times 10^{-2}$ Torr, but cannot be operative in the lower gas pressure range. Neither of the thermal conduction type quartz vacuum gauge or the quartz friction vacuum resonator by alone cannot satisfy the practical need of measuring continuously the gas pressure in the range from the atmospheric pressure to $1 \times 10^{-4}$ Torr in a production process such as a semiconductor fabrication process.

SUMMARY OF THE INVENTION

The object of the present invention is to, therefore, construct a vacuum gauge having a quartz resonator operative to effect the measurement of a broad range of gas pressure. According to the present invention, a pressure detecting element is comprised of a temperature-sensitive quartz resonator, which is selectively operated as a pressure sensor in the thermal conduction mode in the lower pressure range and operated as a pressure sensor in the frictional or hydrodynamic mode in the pressure range from middle to atmospheric pressure such that the single temperature-sensitive or temperature-dependent quartz resonator can provide means for continuously measuring a broad range of gas pressure from about $10^{-4}$ Torr to $10^3$ Torr.

In the present invention, a heat source (for example, a filament) is disposed adjacent to a temperature-dependent quartz resonator having a negative temperature coefficient so as to transfer generated heat to the resonator through an environmental gas medium. When the gas pressure of an environmental medium decreases, the heat amount transferred from the heat source by means of gas molecules of the environmental medium is reduced to thereby reduce the body temperature of the temperature-dependent quartz resonator so that its oscillating frequency is increased due to its negative temperature coefficient. By such correlation, in principle the change of gas pressure is detected in terms of the change of oscillating frequency in the lower range of gas pressure. Actually, according to the present invention, the power supply to the heat source is controlled through negative feedback so as to maintain the oscillating frequency of temperature-dependent quartz resonator at a constant such that the change of gas pressure is actually detected in terms of the change in the supply power voltage of the heat source.

Meanwhile, the resonant current of the temperature-dependent quartz resonator is monitored independently of the oscillating frequency and converted into a DC voltage (hereinafter, referred to as the resonant voltage), which is dependent on the pressure of the environmental gas in the middle to atmospheric pressure range. Thus, both of the power supply voltage and the resonating voltage are monitored in parallel so as to effect the measurement of pressure throughout the entire range (about $10^{-4}$ Torr to $10^3$ Torr) of practical importance

DETAILED DESCRIPTION OF PREFERRED EMBODIMENT

Figure 1:
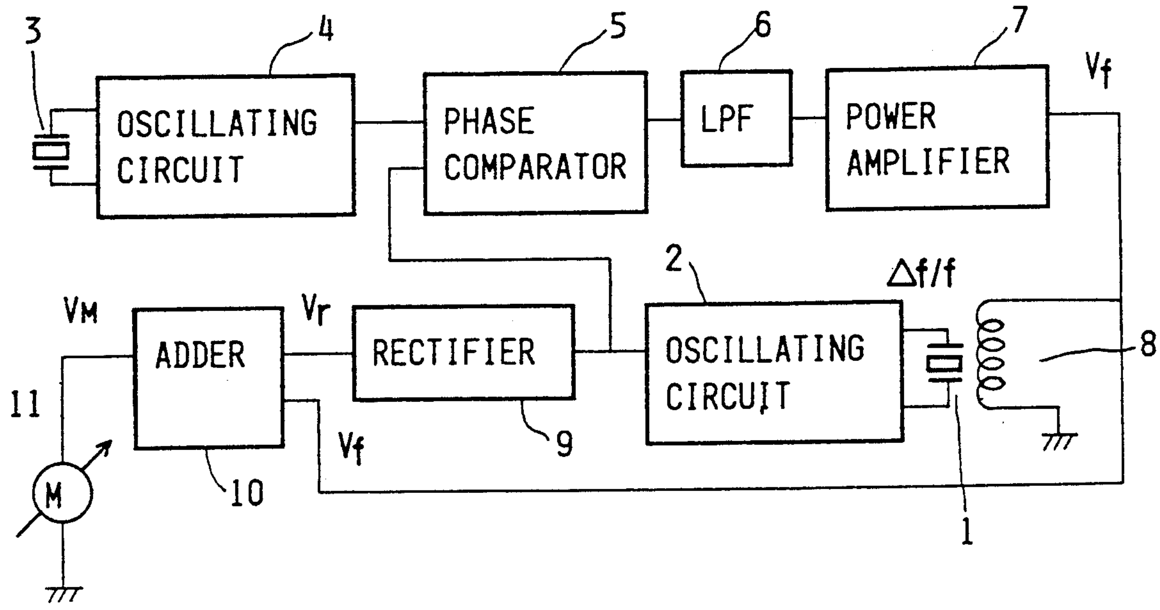
FIG. 1 is a circuit block diagram showing one embodiment of the quartz vacuum gauge according to the present invention.
Figure 2:
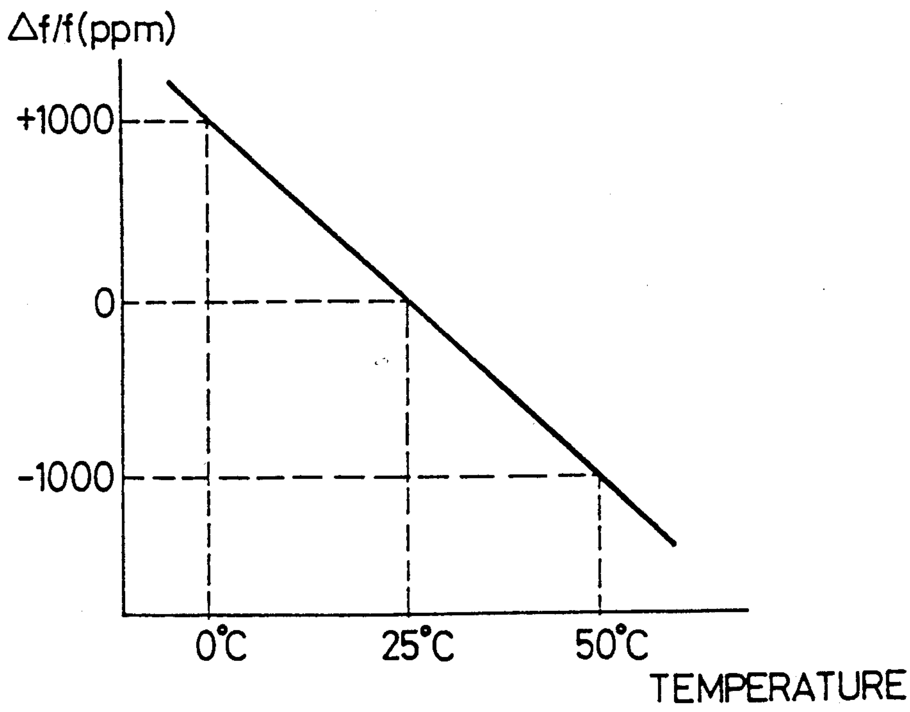
FIG. 2 is a characteristic diagram showing frequency-temperature characteristic of the temperature-dependent quartz resonator used in the inventive quartz vacuum gauge.

Next, the present invention is explained by means of preferred embodiments in conjunction with the drawings. FIG. 1 is a block diagram of one embodiment according to the present invention. A temperature-dependent quartz resonator 1 is disposed within surrounding gas, is oscillated by an oscillating circuit 2, and has the frequency-temperature characteristic shown in FIG. 2 where the oscillating frequency of the resonator is negatively proportional to the body temperature thereof. A reference quartz resonator 3 is oscillated by another oscillating circuit 4 at a constant or reference frequency utilized to regulate the oscillating frequency of temperature-dependent quartz resonator 1. A phase comparator 5 is connected to the respective oscillating circuits 2 and 4 to output a digital signal proportional to the phase difference between the output signals from the respective oscillating circuits 2 and 4. A low-pass filter 6 is connected to convert the digital signal into a corresponding DC voltage, and an electric power amplifier 7 is connected to amplify the DC voltage and to apply it to a heat source 8 (for example, a filament) disposed adjacent to the temperature-dependent quartz resonator within the surrounding gas. As a result, the oscillating frequency of temperature-dependent quartz oscillator 1 is controlled to always coincide with that of the reference quartz resonator 3 through the servo loop or negative feedback loop including the phase comparator 5.

The output signal of oscillating circuit 2 is separately fed to a rectifier 9 in which the output signal is converted into a rectified DC voltage Vr. An adder receives the rectified DC voltage Vr and the power supply voltage Vf applied to the heat source 8 at its input terminals and outputs an added output voltage Vm. A meter 11 is driven according to the output voltage Vm to indicate the value of the gas pressure by means of its indicator.

Figure 3A:
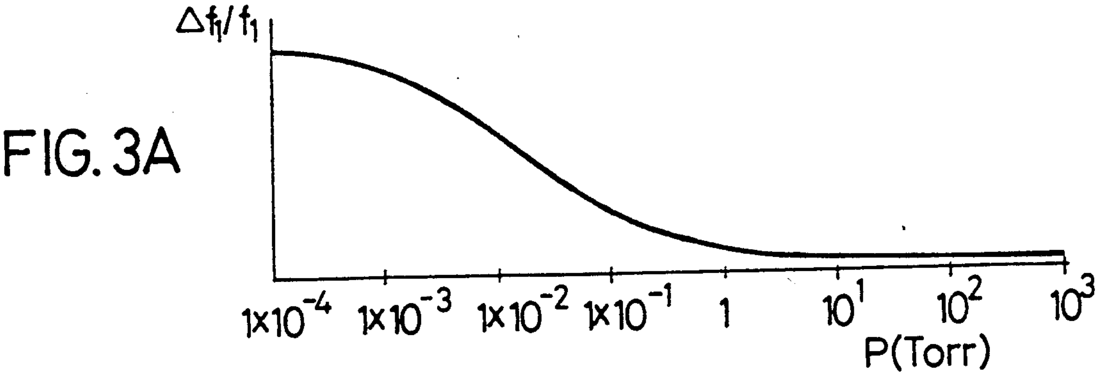
FIGS. 3A to 3D are characteristic diagrams of parts of the inventive quartz vacuum gauge to illustrate the operation thereof.

FIGS. 3A to 3D are characteristic diagrams, illustrating the operation of the FIG. 1 embodiment. FIG. 3A shows the relation between the change of the oscillating frequency of temperature-dependent quartz resonator 1 and the gas pressure of the surrounding gas, which would be obtained when the power supply voltage Vf were controlled constant to the heat source, though such control is not actually effected in the invention. As shown, when the gas pressure increases, the heat amount transferred to the temperature-dependent quartz resonator 1 from the heat source 8 through the intermediate gas medium is accordingly increased so that the oscillating frequency of the temperature-dependent quartz resonator 1 is lowered due to its negative temperature coefficient shown in FIG. 2. However, the resonator 1 does not exhibit substantial sensitivity or response above the pressure range of 1 Torr due to thermal saturation.

Figure 3B:
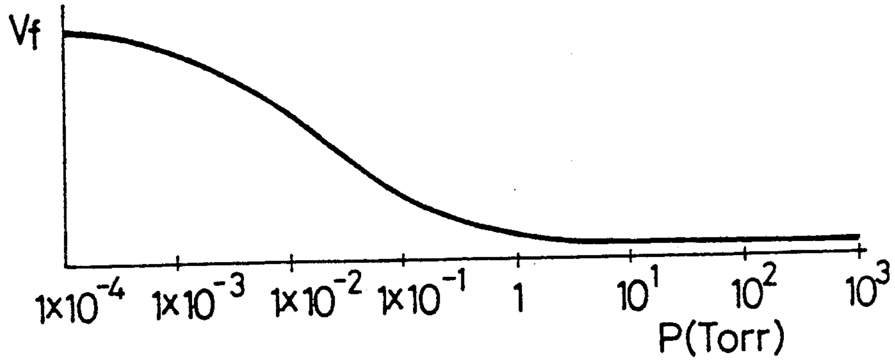

FIG. 3B shows the relation between the pressure of the environmental gas and the power supply voltage Vf to the heat source 8, i.e., the output voltage of power amplifier 7 which is controlled so as to maintain the oscillating frequency of oscillating circuit 2 to coincide with the constant oscillating frequency of oscillating circuit 4 according to the present invention. When the gas pressure begins to increase, the oscillating frequency of temperature-dependent quartz resonator 1 tends to decrease. At this time, the oscillating frequency deviates from the reference frequency of the reference quartz resonator 3 and the frequency difference becomes great therebetween (positive direction) so that the phase comparator 5 outputs a digital signal having great or a coarse value. Accordingly, the low-pass filter 6 reduces its DC output signal, and the power amplifier 7 consequently reduces its output voltage Vf so as to reduce the heat amount transferred from the heat source 8 to the temperature-dependent quartz resonator 1 to thereby cancel the affect of change in the gas pressure. As a result, the oscillating frequency f of the temperature-dependent quartz resonator 1 is maintained constant in the present invention, while instead thereof the power supply voltage Vf to the heat source 8 is changed in accordance with the gas pressure change. As shown in FIGS. 3A and 3B, the relation between the power supply voltage Vf and the gas pressure is quite similar to that between the oscillating frequency change $\Delta f/f$ of temperature-dependent resonator 1 and the gas pressure. Thus, according to the present invention, the value of power supply voltage Vf is monitored to measure the gas pressure, while maintaining the temperature-dependent resonator 1 to oscillate at its resonant frequency.

Figure 3C:
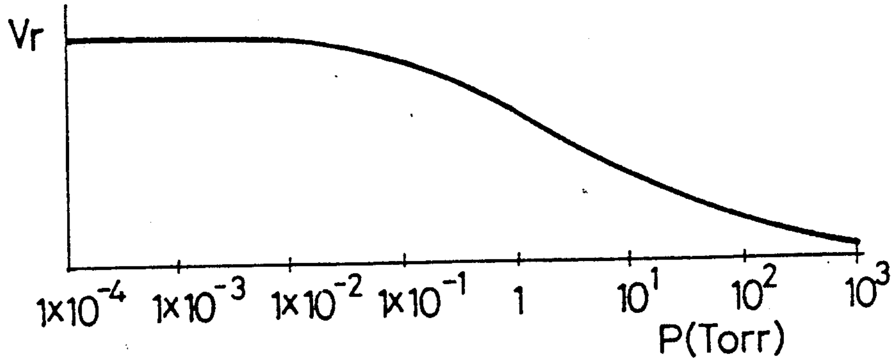

FIG. 3C shows the relation between the surrounding gas pressure and the resonant voltage Vr which is converted from the resonant current of the temperature-dependent quartz resonator 1 while oscillating at the resonant frequency. As shown in the figure, the resonant voltage Vr changes to decrease in the gas pressure range over $1 \times 10^{-1}$ Torr due to frictional resistance of the gas fluid applied to the resonator. Thus, the resonant voltage Vr is also monitored to measure the gas pressure.

Figure 3D:
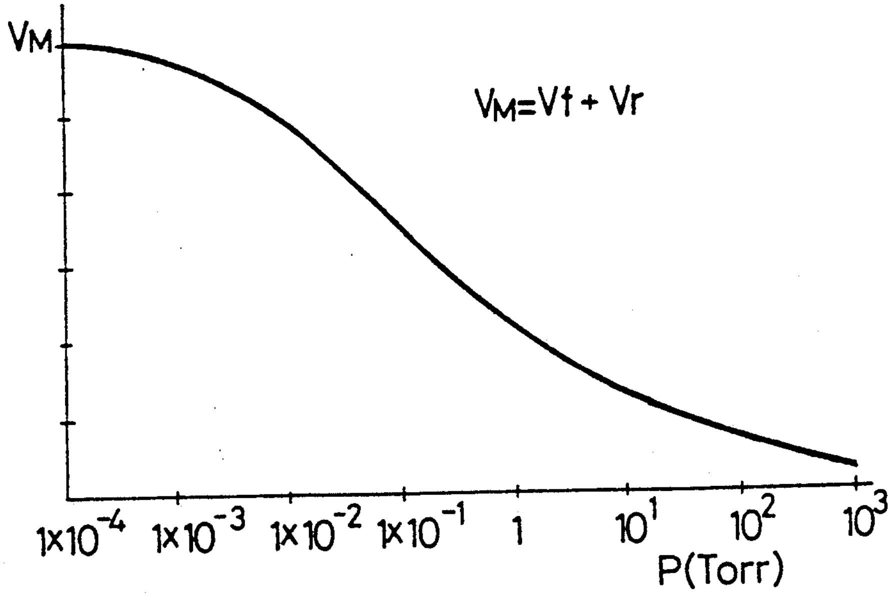

FIG. 3D shows the relation between the output signal Vm of adder 10 which is the combination of output voltages Vf and Vr, and the gas pressure. The output signal Vm operates the meter 11 to indicate the value of environmental gas pressure. The value of Vm is represented by : $Vm = Vf + Vr$. In the relation, the value of Vf is dominant in the gas pressure range below $10^{-1}$ Torr and the value of Vr is dominant in the pressure range above $10^{-1}$ Torr, so that the inventive vacuum gauge has effective sensitivity as a whole over the entire gas pressure range from about $10^{-4}$ Torr to $10^{3}$ Torr.

As described above, according to the present invention, since the temperature-sensitive quartz resonator is utilized for measurement of the lower gas pressure in the thermal conduction mode due to pressure-dependency of the temperature-sensitivity and utilized for measurement of the upper gas pressure range in the frictional mode due to dependency of resonant current on the gas pressure, the single resonator sensor can continuously measure the considerably wide range of gas pressure (from $10^{-4}$ Torr to $10^{3}$ Torr), thereby providing great practical advantage.

What is claimed is:

1. A vacuum gauge for measuring the pressure of environmental gas, comprising:

oscillating means including a quartz resonator disposed in the gas for undergoing oscillation and having a resonant frequency dependent on its body temperature which is dependent on a low pressure range and having a resonant current which is dependent on a high pressure range greater than the low pressure range;

heat source means disposed adjacent to the resonator for supplying heat to the resonator so as to maintain the body temperature thereof and resonant frequency thereof according to the pressure of the environmental gas, and for producing a first output signal representative of a value of the pressure in the low pressure range, the heat source means including a heat source for applying heat to the resonator through the environmental gas, and controlling means for controlling the amount of heat applied to the resonator so as to maintain the body temperature thereof, the controlling means comprising feedback means for comparing the oscillating frequency of the resonator to a given reference frequency to maintain the oscillating frequency constant according to a frequency difference therebetween, and means for regulating the heat source according to the frequency difference;

converting means for converting the resonant current of the resonator into a corresponding second output signal representative of a value of the pressure in the high pressure range; and indicating means for indicating the value of the pressure of the environmental gas according to the first and second output signals.

2. A vacuum gauge according to claim 1; wherein the indicating means includes adding means for adding the first and second output signals to each other to produce a composite output signal indicative of the value of pressure in a range from $10^{-4}$ Torr to $10^{3}$ Torr.

3. A vacuum gauge for measuring pressure of environmental gas comprising: means for predominantly using a characteristic of a quartz resonator whose resonant current is dependent on environmental pressure in a high pressure range, and predominantly using another characteristic of the quartz resonator whose resonant frequency is dependent on its body temperature in a low pressure range which is lower than the high pressure range for measuring the pressure of the environmental gas; and means for providing heat for the body through the environmental gas including a heat source for varying the body temperature according to the environmental pressure.

4. A vacuum gauge for measuring pressure of environmental gas as claimed in claim 3; wherein the high pressure range contains a range $1 \times 10^{-1}$ to $1 \times 10^{-3}$ Torr.

5. A vacuum gauge for measuring pressure of environmental gas as claimed in claim 3; wherein the low pressure range contains a range $1 \times 10^{-4}$ to $1 \times 10^{-1}$ Torr.

6. A vacuum gauge for measuring pressure of environmental gas, comprising: means using both a first characteristic of a quartz resonator whose resonant current is dependent on environmental gas pressure and a second characteristic of said quartz resonator whose resonant frequency is dependent on its body temperature for measuring the pressure of the environmental gas, and means including a heat source for providing heat for the body through the environmental gas.

7. A vacuum gauge as claimed in claim 6; wherein the means for providing the heat for the body from the heat source includes means for heating the environmental gas so that the frequency of said quartz resonator is maintained at a constant value in spite of the environmental pressure variation.

8. A vacuum gauge as claimed in claim 7; wherein the gauge further comprise a reference quartz resonator.

9. A vacuum gauge for measuring gas pressure comprising: oscillating means including a first quartz resonator having a resonant frequency which varies in dependence o the temperature of gas to be measured in a first pressure range and having a resonant current which varies in dependence on the pressure of the gas to be measure din a second pressure range which is greater than the first pressure range; means for heating the gas to be measured to a temperature corresponding to the pressure of the gas to be measured and for producing a first signal corresponding to the temperature and thereby the gas pressure in the first pressure range, the means for heating comprising a reference quartz resonator having a resonant frequency which varies independent of the gas pressure of the gas to be measured in the first pressure range, means for comparing the frequency of the first and reference quartz resonators and for producing the first signal corresponding thereto, and a heater receptive of the first signal to heat the gas in the region adjacent the first quartz resonator to maintain the resonant frequency thereof at a constant value; means for producing a second signal corresponding to the resonant current and thereby the gas pressure in the second pressure range; and means receptive of the first and second signals for processing the signals and producing an output signal representative of the measured gas pressure.

10. The vacuum gauge according to claim 9; wherein the means for processing comprises means for adding the first and second signals.

* * * * *